United States Patent [19]

McKeag

[11] Patent Number: 5,210,488
[45] Date of Patent: May 11, 1993

[54] PROJECTILE VELOCITY MEASUREMENT SYSTEM AND METHOD

[75] Inventor: Malcolm F. McKeag, Kingston, R.I.

[73] Assignee: The United States of America as represented by the Secretary of the Navy, Washington, D.C.

[21] Appl. No.: 779,671

[22] Filed: Oct. 21, 1991

[51] Int. Cl.⁵ .............................................. G01P 3/42
[52] U.S. Cl. .................................... 324/176; 324/160
[58] Field of Search ............... 324/160, 163, 176, 178; 73/488, 518

[56] References Cited

U.S. PATENT DOCUMENTS 2,755,439  7/1956  Whitmore ........................... 324/176

Primary Examiner—Walter E. Snow
Attorney, Agent, or Firm—Michael J. McGowan; Prithvi C. Lall; Michael F. Oglo

[57] ABSTRACT

A projectile velocity measurement system for determining velocity of a launched projectile in a launch tube in an underwater environment, the system comprising a transformer with secondary coils arranged in discrete groups with an increment of insulation shielding each of the groups of coils from the water therearound, the insulation increments being connectable to the projectile and being successively separable from the groups of secondary coils to expose such groups of coils successively to the water to short out such coils and reduce the voltage of the transformer secondary, and means for converting the speed of voltage reduction to the velocity of the projectile in the tube. In the case of launch of the projectile from a submarine, at least preprocessing of the voltage of the secondary is performed in the launch tube, and the preprocessed signal is passed to within the pressure hull of the submarine via a sealed electrical connector in the breechdoor of the launch tube to provide subsafe conditions. A method for determining projectile velocity in a launch tube in a sub-safe manner.

17 Claims, 1 Drawing Sheet

PROJECTILE VELOCITY MEASUREMENT SYSTEM AND METHOD

STATEMENT OF GOVERNMENT INTEREST

The invention described herein may be used by or for the Government of the United States of America for government purposes without the payment of any royalties thereon or therefor.

BACKGROUND OF THE INVENTION (1) Field of the Invention

The invention relates to automatic determination of speed of moving projectiles, and is directed more particularly to a system and method for determining the velocity of a projectile in an underwater launch tube.

(2) Description of the Prior Art

Devices for determining the velocity of projectiles in underwater launch tubes are generally well known. A system commonly in use in submarines for determining the velocity of a launched torpedo, as the torpedo travels through the torpedo tube, includes a wire fastened to the torpedo and wound upon a reel in the submarine outside of the torpedo tube. Travel of a launched torpedo through the tube causes the reel to rotate and activate a tachometer, the output of which is used to determine the velocity of the torpedo in the tube.

Such determination is used in producing an indication as to whether the torpedo was successfully "fired" and, if so, whether its departure speed is within prescribed parameters. In systems in which guidance is exercised on the torpedo after launch, the tube velocity data will be entered in a fire control system, wherein the speed of the torpedo is a critical factor.

In the above-described prior art system, it is necessary that the reel be rewound between firings, or launchings, which is time-consuming and given to errors and entanglements in pressure situations. In addition, there is substantial hardware associated with the reel and tachometer system. Still further, the wire from the torpedo to the wire reel passes through the torpedo tube breech door, a detriment to the "sub-safe" status of the submarine. It is a preferred design criterion in naval submarine marine architecture and in the design systems for the ejection of ordnance and other items from submerged submarines that there be no penetration of the pressure hull which would endanger the submarine within the submarine's range of operating depths. The expression "sub-safe" is a word of art in these fields that means a design has complied with this criterion.

Accordingly, it would be beneficial to have available a system having less in the way of hardware, a minimum of moving parts, and not requiring manual dexterity between firings, and requiring less time for resetting between firings. Further, it would be beneficial to have a system in which a sealed connector provides "sub-safe" conditions.

SUMMARY OF THE INVENTION

Accordingly, an object of the present invention is to provide a system for measuring the velocity of a projectile in a launch tube in an underwater environment, the system having a minimum number of moving parts and a minimum number of hardware components.

A further object of the invention is to provide such a system in which many of the components are located in the launch tube, rather than in the interior spaces of the submarine.

A still further object of the invention is to simplify the "resetting" operation between firings and reduce the resetting time required.

A still further object of the invention is to provide a method for determining the velocity of a projectile in a launch tube in an underwater environment, in a manner that is completely sub-safe.

With the above and other objects in view, as will hereinafter appear, a feature of the present invention is the provision of a projectile velocity measurement system for determining velocity of a launched projectile in a launch tube in an underwater environment, the system comprising a transformer adapted for disposition in the tube and having primary and secondary coils, the secondary coils being arranged in discrete groups with an increment of insulation shielding each of the groups of coils from the water therearound, the insulation increments being connected to each other and being separable each from its associated group of coils, a strand interconnecting a first of the insulation increments and the projectile, whereby movement of the projectile through the tube operates to pull the first insulation increment away from a first group of the secondary coils, and thereafter successive insulation increments from their respective coils to expose successively the secondary coils to cause the secondary coils successively to be disposed in the water and thereby successively shorted out, to reduce the number of active secondary coils to reduce the voltage of the transformer secondary coils, and means for converting the speed of voltage reduction to the velocity of the projectile in the tube.

In accordance with a further feature of the invention, there is provided a method for determining velocity of a launched projectile in a launch tube in an underwater environment, the method comprising the steps of locating in the tube a transformer having primary and secondary coils, arranging the secondary coils in discrete groups, providing an increment of insulation for shielding each group of secondary coils from the water therearound, connecting the increments of insulation together serially in tandem, interconnecting the projectile and a first of the increments of insulation with a strand, whereby movement of the projectile through the tube operates to pull the first increment of insulation away from a first group of secondary coils and thereafter successive of the increments of insulation from their respective groups of secondary coils, to expose successively the secondary coils to cause the secondary coils successively to be disposed in water and thereby shorted out to reduce the number of active secondary coils to reduce the voltage of the transformer secondary coils, and providing means for converting the reduction in voltage to velocity of the projectile in the tube.

The above and other features of the invention, including various novel details of construction and combinations of parts, will now be more particularly described with reference to the accompanying drawings and pointed out in the claims. It will be understood that the particular device and method embodying the invention are shown and described by way of illustration only and not as limitations of the invention. The principles and features of this invention may be employed in various and numerous embodiments without departing from the scope of the claims.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENTS

Figure 1:
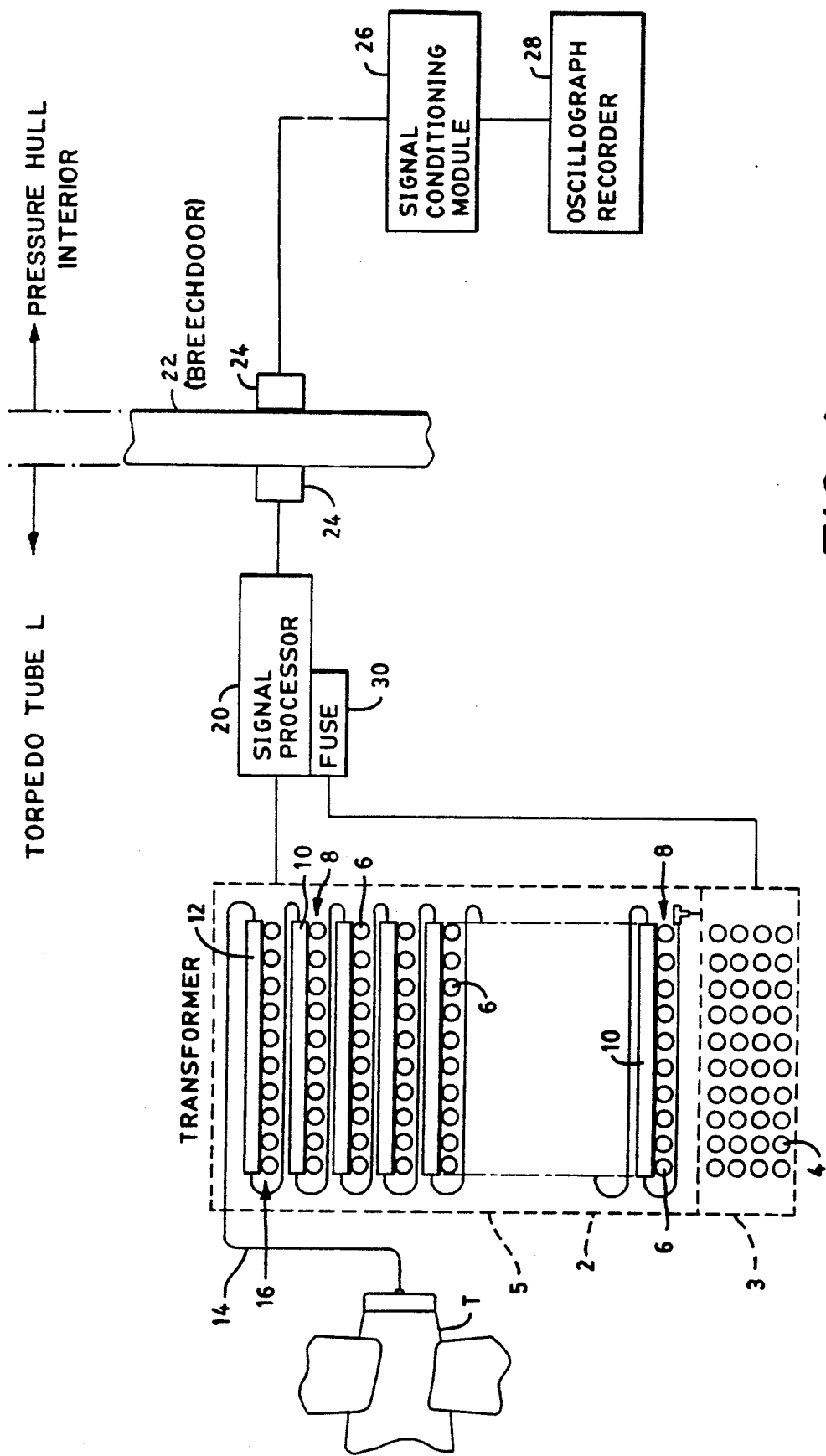
FIG. 1 is a diagrammatic representation of a velocity measurement system, illustrative of an embodiment of the invention.

Referring to the drawing, it will be seen that an illustrative embodiment of the inventive system includes a transformer 2 having therein a primary portion 3 housing primary coils 4 and a secondary portion 5 housing secondary coils 6. The secondary coils 6 are disposed in discrete groups, such as layers 8, each group or layer of secondary coils being covered by an increment of insulation, such as a layer of insulation 10, each increment or layer of insulation 10 being separable from its associated group or layer 8 of secondary coils 6. The increments of insulation 10 are connected to each other such that the increments 10 may be serially separated from the respective groups of secondary coils 6, to successively expose the secondary coils. A first increment 12 of insulation is connectable by a strand 14 to a projectile, such as a torpedo T. Thus, a pulling force exercised on the strand 14, as by the moving torpedo T, operates to pull the first of the increments of insulation 12 from a first group 16 of secondary coils 6, and thereafter, serially and successively, the remainder of the increments of insulation 10 to successively bare the secondary coils 6.

In each of the discrete groups 8 of secondary coils 6, the coils 6 are arranged serially, such that the insulation increment 10 associated therewith is adapted to uncover the coils 6 serially within each of the groups of secondary coils.

The transformer 2 is adapted to be mounted in a projectile launch tube as, for example, a torpedo tube and is therefore disposed in an underwater environment, namely, a saline seawater environment. Exposure of the secondary coils 6 to the seawater thereabout operates to short out the exposed coils, reducing the voltage of the transformer secondary 5 accordingly.

The system further includes a signal processor 20 which is adapted to sense the speed of voltage drop in the transformer secondary 5. The signal processor 20 is adapted for disposition in the torpedo tube and is operative to transmit its data signal through a breechdoor 22, as by way of a suitable sealed connector 24, to a signal conditioning module 26. It will be appreciated that by passing the velocity signal through the sealed connector 24 in the breechdoor 22, the torpedo velocity information is made available within the launching submarine's pressure hull in a completely sub-safe manner. The signal conditioning module is adapted to convert the data received from the signal processor to projectile velocity and to place the data in desired form for display, recordation, and/or forwarding on to a fire control computer. In the usual case, a visual display and recording means will be desired, and a known device for displaying torpedo velocity and other torpedo functions, and recording same, is the oscillograph recorder 28.

In operation, the breechdoor 22 of the torpedo tube is opened and a transformer secondary 5 is mounted in place, typically on a suitable mounting fixture (not shown) of the tube permitting quick and easy slide-on and lock positioning of the transformer secondary 5 adjacent the transformer primary 3. A fuse 30 for the signal processor 20 is snapped into place, and the signal processor, signal conditioning module 26, and oscillograph recorder 28 are energized for operation. A projectile, such as the torpedo T, is then slid into the tube L. The strand 14 is fastened by a breakaway snap (not shown) to the after end of the torpedo T. The breech door is then closed, and tube forward doors opened to flood the tube and clear the tube forward end for firing.

Upon firing of the torpedo, the strand 14 separates the first increment of insulation 12 from the first group of secondary coils 16. Inasmuch as the increments of insulation 10 are connected in tandem, the increments of insulation are successively separated from their respective coils to expose successively the secondary coils to cause the secondary coils successively to be disposed in water and thereby successively to be shorted out. The number of active secondary coils is thereby progressively reduced and, in due course, reaches zero. The voltage of the transformer secondary 5 is thereby reduced from a given starting maximum to substantially zero.

The signal processor 20 senses the rapid and progressive drop in voltage of the transformer secondary 5 and forwards the data to the signal conditioning module 26 which converts the speed of voltage drop to velocity of the torpedo in the tube. For example, the signal processor 20 may sample the secondary voltage every 0.05 seconds and send its findings to the signal conditioning module. Using the formula V/S=velocity of projectile, where V=voltage and S=the predetermined 0.05 seconds, the signal conditioning module 26 calculates the projectile velocity. If a change between readings taken by the signal processor is 2.5 volts, the signal conditioning module will calculate the velocity of the projectile at that point as V/S, or 2.5/0.05 or 50 ft./sec. The oscillograph recorder 28 then displays and records the results of the calculations. The recorder 28 may also, simultaneously, record other projectile functions as desired.

The strand 14 is anchored in the transformer secondary and is designed to break free of the torpedo as the torpedo leaves the tube. The elimination of the active secondary coils 6 operates to overload the signal processor fuse 30, causing the fuse to blow and shutting down the signal processor 20.

To repeat the cycle, the launch tube forward doors are closed, the tube blown substantially free of water by introduction of air, and the breech door opened. The used transformer secondary 5 and the strand 14 are removed and replaced. The system is then ready for another launch, or firing.

The transformer may be of any design providing discrete groups of secondary coils, with a separable increment of shielding insulation associated with each group. In one embodiment, the transformer is of approximately one foot in length, one foot in width, and about nine inches in height. The discrete groups of secondary coils are layers, as shown diagrammatically in FIG. 1, with ten coils per layer and thirty layers disposed in the secondary, along with thirty layers of separable insulation material. In a thirty foot launch tube, each of the thirty insulation layers is stripped away by the time the projectile leaves the launch tube. The entire transformer may be removed from the tube and replaced by a new transformer between launchings, or, alternatively, as noted above, the transformer primary may remain in the tube and have attached thereto a new secondary.

It will be understood that many additional changes in the details, materials, steps and arrangement of parts, which have been herein described and illustrated in order to explain the nature of the invention, may be used by those skilled in the art within the principles and scope of the invention as expressed in the appended claims.

What is claimed is:

1. A projectile velocity measurement system for determining velocity of a launched projectile in a launch tube in an underwater environment, the system comprising a transformer adapted for disposition in said tube and having primary and secondary coils, said secondary coils being arranged in discrete groups with an increment of insulation shielding each of said groups of coils from the water environment, said insulation increments being connected to each other and being separable each from its associated group of coils, a strand adapted for interconnecting a first of said insulation increments and said projectile, whereby movement of said projectile through said tube operates to pull said first insulation increment from a first group of said secondary coils, and thereafter successive insulating increments from their respective coils, to expose successively said secondary coils, to cause said secondary coils successively to be disposed in said water and thereby successively shorted out, to reduce the number of active secondary coils to reduce the voltage of said transformer secondary coils, and means for converting the speed of said voltage reduction to velocity of said projectile in said tube.

2. The projectile velocity measurement system in accordance with claim 1 wherein said discrete groups of secondary coils comprise layers of secondary coils.

3. The projectile velocity measurement system in accordance with claim 2 wherein said insulation increments comprise layers of insulation material.

4. The projectile velocity measurement system in accordance with claim 1 wherein said means for converting said speed of said voltage reduction to velocity of said projectile in said tube comprises a signal processor disposed in said tube and adapted to sense the voltage of said transformer secondary and to send a signal indicative thereof, and a signal conditioning module adapted to receive said velocity of said signal processor and to transmit a signal indicative of said velocity.

5. The projectile velocity measurement system in accordance with claim 4 and including display and recorder means adapted to receive said signal from said signal conditioning module and to display said signal visually and record said signal.

6. The projectile velocity measurement system in accordance with claim 1 wherein s id transformer is readily removable from said tube.

7. The projectile velocity measurement system in accordance with claim 1 wherein said transformer primary is resident in said tube for a plurality of launchings, and said transformer secondary is readily removable and replaceable, such that a new transformer secondary is disposed in said tube for each launching.

8. The projectile velocity measurement system in accordance with claim 4 and including means for shutting down said signal processor after a last of said increments of insulation is removed from a last of said groups of secondary coils.

9. The projectile velocity measurement system in accordance with claim 3 wherein said transformer secondary comprises about thirty of said layers of secondary coils and each of said layers of secondary coils includes about ten secondary coils.

10. The projectile velocity measurement system in accordance with claim 4 wherein said signal processor is adapted to sample said voltage of said transformer secondary every 0.05 seconds.

11. The projectile velocity measurement system in accordance with claim 1 wherein in each of said discrete groups of secondary coils said coils are arranged serially, such that said insulation increment associated therewith is adapted to uncover said coils serially within each of said groups of secondary coils.

12. The projectile velocity measurement system in accordance with claim 4 wherein said signal conditioning module is disposed outside of said tube and within a launching vessel, and said signal processor in said tube is in communication with said signal conditioning module by way of a communication line extending through a sealed connector.

13. The projectile velocity measurement system in accordance with claim 12 wherein said sealed connector is disposed in a tube breechdoor.

14. A method for determining velocity of a launched projectile in a launch tube in an underwater environment, said method comprising the steps of locating in said tube a transformer having primary and secondary coils, arranging said secondary coils in discrete groups, providing an increment of insulation for shielding each discrete group of secondary coils from water therearound, each of said increments of insulation being separable from its respective discrete group of secondary coils, connecting the increments of insulation together serially in tandem, interconnecting said projectile and a first of said increments of insulation with a strand, whereby movement of said projectile through said tube operates to pull said first increment of insulation away from a first group of said secondary coils and thereafter successive of said increments of insulation from their respective groups of secondary coils, to expose successively said secondary coils to cause said secondary coils successively to be disposed in water and thereby successively shorted out to reduce the voltage of said transformer secondary coils, and providing means for converting the reduction in voltage to velocity of said projectile in said tube.

15. The method for determining velocity of a launched vehicle in accordance with claim 14, including the step of arranging said secondary coils in each of said groups of secondary coils serially, whereby said increment of insulation associated therewith is pulled from said secondary coils serially within each of said groups of secondary coils.

16. The method for determining velocity of a launched projectile in a launch tube in accordance with claim 15, wherein the step of providing means for converting the reduction in voltage to velocity of said projectile in said tube comprises providing a signal processor in said tube for sensing voltage of said transformer secondary and for sending a signal indicative thereof, and providing a signal conditioning module outside of said tube and inside a launch vehicle for converting the signal to another signal indicative of said velocity.

17. The method for determining velocity of a launched projectile in a launch tube in accordance with claim 16 and including the additional step of providing a display and recording device outside of said tube and inside said launch vehicle, said device being adapted to receive said another signal from said signal conditioning module and effect visual display and effect recordation of said signal.

* * * * *